United States Patent [19]
Belart et al.

[11] 3,870,377
[45] Mar. 11, 1975

[54] BRAKE PRESSURE MODULATOR

[75] Inventors: Juan Belart, Walldorf; Werner Fink; Dieter Kircher, both of Frankfurt; Hubertus Von Grünberg, Niederhochstadt, all of Germany

[73] Assignee: ITT Industries, Inc., New York, N.Y.

[22] Filed: July 9, 1973

[21] Appl. No.: 377,476

[30] Foreign Application Priority Data
July 15, 1972 Germany............................ 2234862
Oct. 9, 1972 Germany............................ 2249352

[52] U.S. Cl.......... 303/21 F, 188/181 A, 303/21 AF
[51] Int. Cl................................................ B60t 8/06
[58] Field of Search......... 303/21 F, 21 AF, 61–63, 303/68–69, 52; 188/181 A

[56] References Cited
UNITED STATES PATENTS
3,659,905  5/1972  Goulish ............................ 303/21 F
3,671,085  6/1972  Pasek et al. ..................... 303/21 F
3,694,038  9/1972  Ingram et al. ................... 303/21 F
3,704,047  11/1972  Yarber................................. 303/52
3,729,235  4/1973  Bach et al. ......................... 303/21 F
3,788,710  1/1974  Grunberg et al. .............. 303/21 AF

*Primary Examiner*—Trygve M. Blix
*Assistant Examiner*—D. C. Butler
*Attorney, Agent, or Firm*—John T. O'Halloran; Menotti J. Lombardi, Jr.; Alfred C. Hill

[57] ABSTRACT

A brake pressure modulator arrangement for an antiskid control system is formed as an integral part of the brake actuation arrangement. These two arrangements are integrated in such a way that part of the brake actuation arrangement functions as a part of the modulator arrangement. The modulator arrangement also moves during normal braking without antiskid control so that no damage due to non-usage can occur. The modulator-actuation arrangement has high sensitivity and a low hysteresis. In addition the antiskid control cannot be felt in the brake pedal. Further, the modulator-actuation arrangement is provided with an additional arrangement to permit actuation of the brakes on an emergency basis should the brake pressure accumulator fail.

36 Claims, 7 Drawing Figures

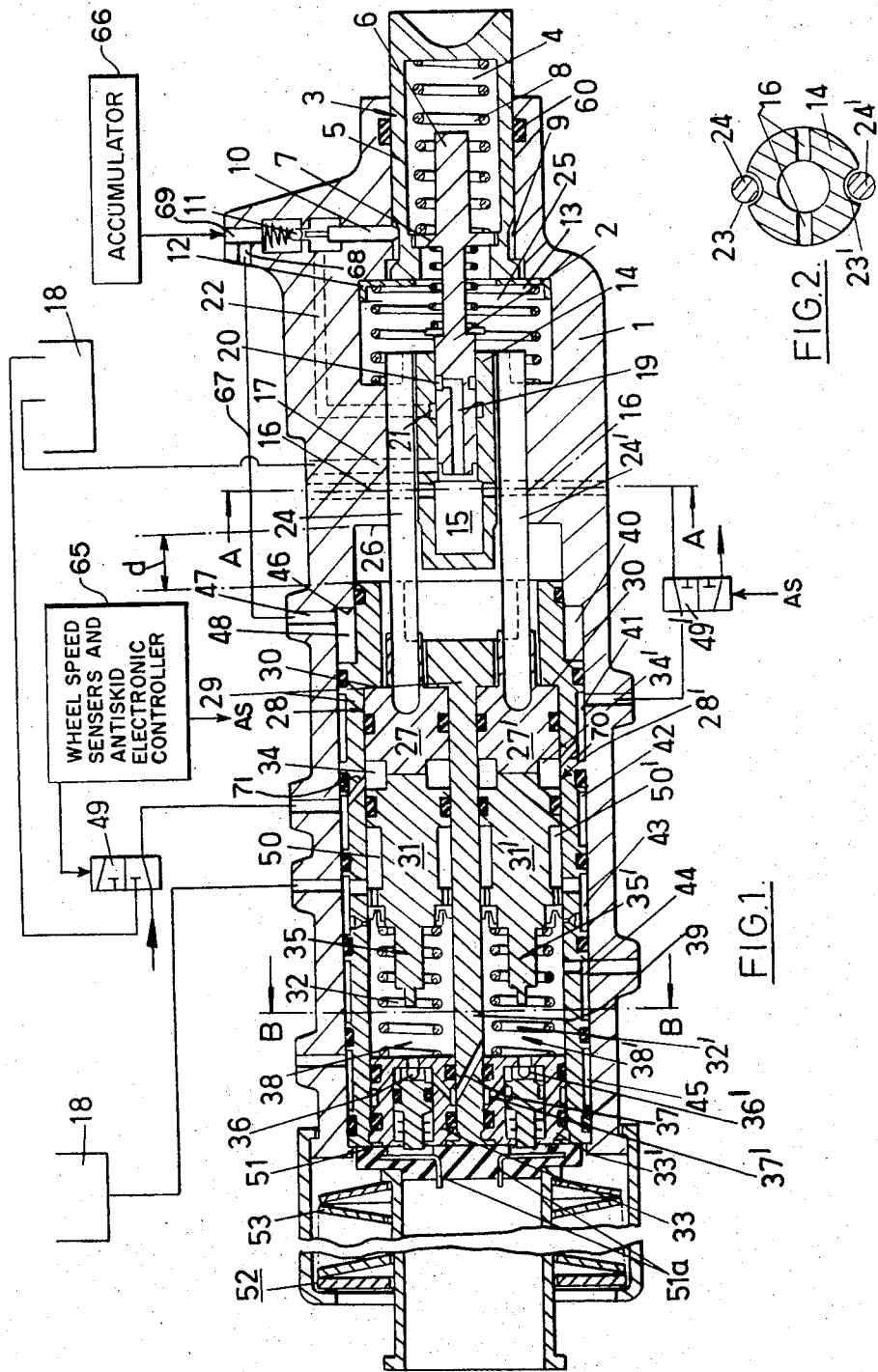

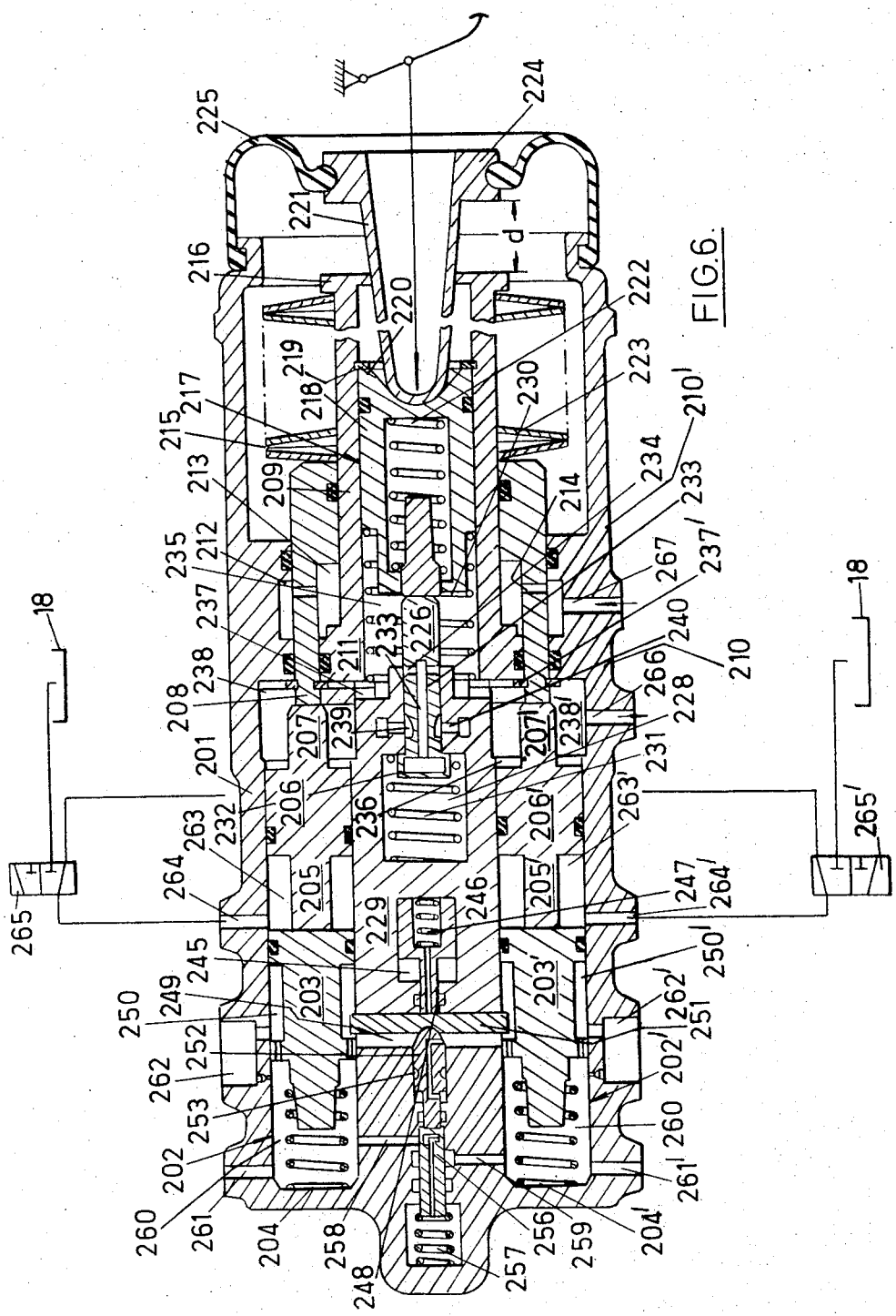

3,870,377

BRAKE PRESSURE MODULATOR

BACKGROUND OF THE INVENTION

This invention relates to a brake pressure modulator incorporated into the brake actuation system for an antiskid control system, particularly for motor vehicles, in order to control the effective brake pressure in the sense of an optimum braking dependent on a variable signal related to the state of motion of a wheel.

In most kinds of antiskid control devices, the brake pressure modulator is an independent structural unit, which is incorporated into the existing brake system. This may be of advantage, particularly in the case where a brake system after being provided for the vehicle is equipped with an antiskid control device. In the long run, however, disadvantages prevail, for example, such a device occupies much additional room and is expensive in production. For these reasons there is the demand for a pressure modulator integrated into the brake actuation system.

A further step towards this aim was made with the device according to the German Patent Specification No. 2,129,363, laid open for public inspection. There is described therein the known twin master cylinder of a two-circuit brake system with pump circulation booster system. Against the front surface of the two master cylinders one control device is mounted which is dependent for its operation on a control signal indicating the danger of wheel locking. The control device to prevent wheel lock produces an axial force directed opposite to the axially directed brake actuation force in order to control the brake pressure effective in the wheel brake cylinders in the sense of an antiskid control. Of course, with this device only a so-called on-off-control is possible, i.e, the wheels of the other axle, which are actuated by one master cylinder of the two-circuit-brake device, can only be controlled together. However, an all-purpose device should also enable a control with diagonal brake circuit distribution, a separate control for all vehicle wheels, a separate control for the front axle wheels with joint control at the rear wheels and a separate control for the front wheels with a four-cylinder two-circuit brake without the structure of the device having to be changed. In other words these various types of control should be possible by only changing a corresponding hydraulic connection.

The device of the above cited German Patent Specification will have a strong hysteresis due to its numerous seals between the brake actuation and the wheel brake. Thus, the driver has a bad feeling when braking, and, moreover, the antiskid control will be felt at the brake pedal which is undesirable.

In addition, in the device of the above cited German Patent Specification, there is no real integration of the brake pressure modulator arrangement into the brake actuation arrangement, since the pressure modulator arrangement is actuated only when an antiskid control is necessary. Since the need for antiskid control is likely to be relatively rare, it may happen that the seals of the pressure modulator arrangement become brittle, since they are not used for a long time. Thus, in the case of emergency the functioning capability of the pressure modulator arrangement is strongly impaired.

The German Patent Specification No. 1,940,632 laid open for public inspection describes a combined device in which the brake actuator and the pressure modulator are formed in one and the same structural unit. The design provides a pressure modulator with a master cylinder for each controlled wheel. The push rods of the movable separating walls, which subdivide the modulator cylinders, are connected with each other by means of a system of joints and with the brake actuation system by means of a reaction chamber. By means of a brake control valve and an opposing control valve, which is provided for each controlled wheel, the two chambers of the separate pressure modulators can be connected to the auxiliary power source dependent upon the state of motion of the wheel.

Due to the fact that for each wheel to be controlled a brake amplifier, which also acts as a pressure modulator, and a master cylinder have to be provided, the device as a whole will need considerable room.

Also in this arrangement, the movement of the modulator wall during an antiskid control cycle can be felt as jerks at the brake pedal. Such jerks of the brake pedal, which come unexpected for the driver, are disturbing and may have dangerous effects on the driver's braking, particularly in difficult traffic situations or full braking. The separate modulators, which are hydraulically arranged in parallel, are actuated by the brake pedal and control the brake pressure separately and independently of each other through the separate push rods. In such an arrangement the control movements of the separate push rods are added at the brake pedal. This may lead to a vibration of the brake pedal which may be completely irregular and unforeseeable in its rhythm and strength and possibly cause shock reactions.

In order to avoid this second disadvantage the German Patent Specification No. 1,941,098 laid open for public inspection suggests the provision of a decoupling between the brake pedal and the movable modulator wall, for instance, the master cylinder piston. This decoupling is effective during the times in which a pressure change in the concerned brake circuit, which is controlled by the modulator, takes place. This involves the danger that for otherwise caused pressure changes, for example, in case of a failure of the auxiliary pressure source, or in case of wrongly acting valves, or in case of a leakage, or in case of similar disturbances, the decoupling will also occur and, thus, the full braking cannot be performed with the brake pedal via the frictional connection to the master cylinder. For these cases there must, therefore, be provided another safety device. Having the additional decoupling and safety devices, this device, which is large anyway, will thus occupy even more room.

SUMMARY OF THE INVENTION

An object of this invention is to provide a room-saving, inexpensive auxiliary power brake actuation system into which is integrated the antiskid device.

Another object of the present invention is to provide such a combined arrangement for use, with only hydraulic connection changes, for all concerned brake-circuit and control divisions, i.e., for joint control of the wheels of front and rear axle, for all-wheel-control, for control under diagonal brake circuit distribution, for separate control of the front axle with joint control at the rear axle (Y-control) and separate control of an axle provided with four-cylinder-two-circuit brakes.

Still another object of the present invention is to provide such a combined brake actuation and antiskid modulator arrangement that has a low hysteresis to provide the driver with a good feeling in the brake pedal when braking and to eliminate the feel of the antiskid control process at the brake pedal.

A feature of the present invention is the provision of a combined brake pressure modulator and brake actuator arrangement for an antiskid control system comprising: a source of pressurized brake pressure medium; a brake pressure medium reservoir; a housing having a longitudinal axis; a first chamber within the housing coupled to the source to receive the pressurized medium upon actuation of a brake actuator, the first chamber supplying the pressurized medium to at least a first of a plurality of brake circuits; at least a first floating piston disposed in the housing spaced from the first chamber and parallel to the axis, the first floating piston having an actuating surface in transverse relation to the axis adjacent the first chamber, the first floating piston when actuated supplying braking pressure to at least a second of the plurality of brake circuits connected to the housing adjacent the surface of the first floating piston opposite and parallel to the actuating surface; and at least a first control valve external to the housing having a first operating position to connect the first chamber to the actuating surface to thereby actuate the first floating piston by the pressurized medium upon actuation of the brake actuator and a second operating position to connect the actuating surface to the reservoir, the first control valve responding to an antiskid control signal to switch between the first and second operating positions to control the motion of the first floating piston to enable modulation of the braking pressure in the second of the plurality of brake circuits to prevent wheel lock.

The arrangement according to this invention also has other important features and advantages.

The brake pressure modulator is so integrated into the brake actuation device, that parts of the brake actuation system take over the function of the brake pressure modulator. The brake pressure modulator is no longer an independent structural unit, which in the known manner is combined into a compact device together with the brake actuation system. The components modulating the brake pressure are also moved during normal braking without locking danger, and, thus, no damages due to long non-usage can arise. Testing devices by means of which the functioning capability of the brake pressure modulator could be examined prior to driving, can thus be omitted. The hydraulic correcting element of the antiskid control circuit of this invention in reality only consists, per controlled wheel, of a 3/2 directional control valve which receives its actuation signal from the electronic antiskid control signal generator and in turn acts upon the brake actuation system which forms part of the controlled circuit. This is in contrast to the above mentioned prior art where a brake pressure modulator arrangement was supplied for each controlled wheel.

With the described device all varieties of control subdivisions can be realized, i.e., the so-called on-off-control, joint control of the wheels of one axle, the diagonal control, the separate control of all vehicle wheels, the separate control at the wheels of the front axle with joint control of the rear wheels, as well as the separate control of the front wheels which are controlled by a four-cylinder-two-circuit-brake. For these purposes there is no change of the device necessary, only the corresponding hydraulic connection has to be established.

The device according to this invention moreover distinguishes itself by sensitiveness and low hysteresis, since during the actuation only the friction of one seal between the housing and the correcting element has to be overcome by the foot force of the driver.

Moreover, it is of great advantage that during antiskid control the pulsating movements of the floating pistons are not transmitted to the brake pedal and cannot be felt there.

The device of the present invention is suitable for a continuous smooth control, since there is no abruptly switched separating valve. Thus, a smooth pressure distribution which oscillates around the ideal value can be achieved since in each phase of the control cycle the distribution is determined by the electromagnetic valve and never by a suddenly opening separating valve.

The device according to FIG. 5 has the special advantage that one piston for the mechanical transmission of brake pressure force and one seal between the cylindrical body and the wall of the housing can be omitted. Through the special arrangement of the two floating pistons the floating piston by which the brake force is transmitted during a failure of the reservoir pressure can be formed with a larger effective surface, so that a more effective emergency braking is achieved. The device is altogether smaller.

BRIEF DESCRIPTION OF THE DRAWING

Above-mentioned and other features and objects of this invention will become more apparent by reference to the following description taken in conjunction with the accompanying drawing, in which:

FIG. 1 illustrates a longitudinal cross-sectional view through the first embodiment of the device according to the principles of the present invention;

FIG. 2 illustrates a cross-sectional view along the line A—A of FIG. 1 of the arrangement of the accumulator braking valve and the mechanical actuation rams in relation with each other;

FIG. 6 illustrates a longitudinal cross-sectional view through a third embodiment of the device according to the principles of the present invention.

DESCRIPTION OF THE PREFERRED EMBODIMENT

Figure 4:
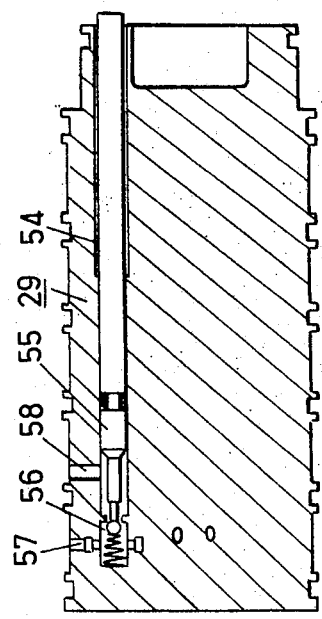
FIG. 4 illustrates the arrangement of a pressure balancing device in the embodiment of FIG. 1 in the case of a mechanical emergency actuation.

FIG. 1 illustrates a so-called accumulator-braking-device in accordance with the principles of the present invention. In the housing 1 is arranged an accumulator braking valve 2 together with a so-called pedal travel simulator 3, which can be actuated for the braking process by the brake pedal which is not shown. The pedal travel simulator 3 comprises an actuation element 5, which is open in a blind-end bore 4 in the direction toward the interior of housing 1 and which is sealed against the housing wall by seal 60. Into blind-end bore 4 projects with great clearance the valve slide 6 of accumulator braking valve 2, which is held in the actuation direction at a stop in the blind-end bore 4 by means of a strong spring 8 acting on the adjacent transverse surface of a collar 7. In the outer surface of actuation element 5 a circular groove is disposed whose bevelled flank 9 cooperates with the actuation element 10 of a known accumulator connection valve 11, which is arranged in housing 1. A pressure disc 12 is disposed against the surface of the one end of actuation element 5 of pedal travel simulator 3 and at the same time is disposed against an adjacent step widening the interior of housing 1. Pressure disc 12 is pressed against this step by means of a spring 13. The spring 13 is supported by an additional step, which is spaced from element 5 and narrows the interior of housing 1. Accumulator braking valve 2 is formed in the known manner as a slide valve. One end of valve slide 6 projects into a shell 14 having a closed bottom to form a chamber 15 between the front surface of valve slide 6 and the closed bottom of shell 14. From chamber 15 cross bores 16, contained in shell 14 and housing 1 lead to the pressure medium lines of the brake circuit which can be dynamically actuated.

Another cross bore 17, which can be closed by valve slide 6, leads from chamber 15 through shell 14 and housing 1 to the reserve tank 18. In addition, chamber 15 is connected by a longitudinal bore 19 in valve slide 6 with a circular groove 20, disposed on the outer surface of valve slide 6 which can be made coincident by displacement of valve slide 6 with a circular groove 21 disposed in the inner surface of shell 14. Circular groove 21 is connected with accumulator connection valve 11 by means of connecting bore 22.

Figure 3:
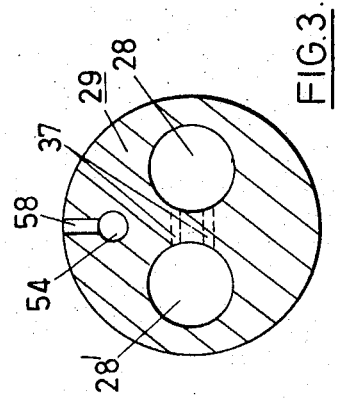
FIG. 3 illustrates a cross-sectional view along the line B—B in FIG. 1 through the actuation cylinders.

On the outer surface of shell 14 two semi-circular recesses 23 are arranged which lie diagonally opposite each other (see also FIG. 2) and which are complemented by corresponding recesses in the inner wall surface of housing 1. Inserted into these recesses are two actuation rams 24 and 24'. One end of rams 24 and 24' project into the chamber 25, which is formed by the above mentioned interior surface steps of housing 1, and on the other end of these rams project into the interior of housing 1, which is widened by another step 26. In the area of step 26 the other ends of rams 24 and 24' engage two pistons 27 and 27' via corresponding recesses. These two pistons 27 and 27' are slidably arranged in cylinder bores 28 and 28' of a cylindrical body 29 (see also FIG. 3). Body 29 can be shifted in the interior of housing 1 for a certain distance d. The end surfaces of pistons 27 and 27', which are engaged by actuation rams 24 and 24', engage a step 30 in cylinder bores 28 and 28'. The other or front surfaces of pistons 27 and 27' engage the adjacent surface of floating pistons 31 and 31', respectively. Pistons 27 and 27' and pistons 31 and 31' are held against the stop formed by step 30 by means of springs 32 and 32' which in turn are supported by locking pieces 33 and 33' of the respective cylinder bores 28 and 28'. The surfaces of pistons 27 and 27' and floating pistons 31 and 31' facing each other form circular chambers 34 and 34'. Floating pistons 31 and 31' have extensions 35 and 35' which can actuate non-return valves 36 and 36' which are arranged in locking pieces 33 and 33'. Each of these non-return valves 36 and 36' controls a connecting channel 37 or 37' in the partition wall 39 between chambers 38 and 38' which lie in front of floating pistons 31 and 31'. By means of recesses in the outer surface of cylindrical body 29, several circular chambers 40, 41, 42, 43, 44 and 45 disposed one behind the other and sealed against each other are formed between the outer surface of body 29 and the inner surface of housing 1. The first of these circular chambers 40 is limited by a step 46 in the inner surface of housing 1 and is directly connected to the pressure reservoir or accumulator 66 by means of a bore 47, hydraulic connection 67 and bores 68 and 69. The reservoir pressure is applied to the ring surface 48 of body 29 which holds body 29 in the original position, distance d away from step 26. The next circular chamber 41 is connected at one end by means of a bore 70 in the wall of cylindrical body 29 with circular chamber 34' between piston 27' and floating piston 31' and is connected at the other end via a pressure medium connection in the wall of housing 1 with first outlet of a 3/2 directional control valve 49'. The second outlet, of valve 49' is connected with the reservoir 18 and the inlet of valve 49' is connected to chamber 15 in accumulator braking valve 2. Circular chamber 42 is connected in a corresponding manner at one end by a bore 71 in the wall of cylindrical body 29 with circular chamber 34 between piston 27 and floating piston 31 and is connected at the other end via a pressure medium connection in the wall of housing 1 with the outlet of a 3/2 directional control valve 49, which is connected in the same manner as described above with respect to control valve 49'.

Circular chamber 43 is connected on one side by bores in the wall of cylindrical body 29 with the two circular chambers 50 and 50' which are formed by recesses in the outer surfaces of floating pistons 31 and 31'. Chambers 50 and 50' are connected by breather bores with chambers 38 and 38' lying in front of floating pistons 31 and 31'. The other side of chamber 43 is connected by a pressure medium connection in the wall of housing 1 with reservoir 18. Circular chamber 44 is connected by a bore in the wall of cylindrical body 29 with chamber 38' lying in front of floating piston 31' and it is also connected by a pressure medium connection in housing 1 with the wheel brake cylinders of one statically braked wheel, while circular chamber 45 is in a corresponding manner connected with chamber 38 lying in front of floating piston 31 and with the wheel brake cylinders of the other statically braked wheel.

Against the two locking pieces 33 and 33' which include the two above mentioned non-return valves 36 and 36' there is mounted a stop plate 51 of insulating material, which includes the electrical contacts 51a of a warning indicator. These contacts 51a can be actuated, during bad ventilation conditions of one of the two chambers 38 and 38' lying in front of floating pistons 31 and 31' and during actuation of the brake device, by the associated non-return valves 36 and 36' which in turn is opened, during bad pressure conditions, by an extension of the associated floating pistons 31 and 31'.

The device is closed by a spring pot unit 52 which contains a strongly prestressed emergency spring 53 which is supported at one end by the bottom of spring pot unit 52 and at the other end by stop plate 51. Spring 53 moves relative to housing 1 when the pressure in the pressure reservoir applied to surface 48 of cylindrical body 29 is reduced or fails. This relative movement places spring 53 into a position that will enable this spring to perform an emergency braking.

In FIG. 4 another device can be seen which also enters into action in the case of an emergency braking when the pressure in the pressure reservoir or accumulator fails. Cylindrical body 29 contains another cylindrical bore 54 (see also FIG. 3), in which a ram 55 is movably arranged. Ram 55 projects in a direction toward the brake actuation system and which can actuate the normally closed valve closing element of a seat valve 56 which is arranged in front of it. Upon a failure of the pressure in the accumulator seat valve 56 is opened by the ram 55 striking housing 1 at step 46 which will apply brake pressure via the bores 57 and 58 to the wheel brake cylinders of the two statically braked wheels.

The device of FIG. 1 functions as follows. When the driver actuates the brake pedal for a normal braking at first the pedal travel simulator 3 enters into action. The actuation element 5 is shifted against the force of the strong simulator spring 8, the prestress of which is equal to the force of the countersprings plus the occurring frictional forces. In this manner accumulator connection valve 11 is lifted from its seat by bevelled flank 9 in the outer surface of actuation element 5, so that the accumulator pressure can get through the connection bores 22 to the still closed accumulator braking valve 2. Simulator spring 8 is compressed corresponding to the control pressure, i.e., corresponding to the pressure of the brake pedal. At the same time the force of the foot is transmitted via the strong simulator spring 8 onto valve slide 6 of accumulator braking valve 2, so that valve slide 6 is shifted according to increasing force of the foot and increasing compression of the simulator spring 8. In this manner pressure medium connection 17 between chamber 15 and reservoir 18 is interrupted and accumulator braking valve 2 is opened by making groove 21 in shell 14 coincident with groove 20 in valve slide 6. The accumulator pressure propagates through bore 19 of accumulator braking valve 2, which is now open, for corresponding to the force of the foot, through chamber 15 and pressure medium connection 16 to the wheel brake cylinders of the dynamically braked wheels on the one side. On the other side the accumulator pressure propagates through the 3/2 directional control valves 49 and 49', which are in their original position, to the circular chambers 41 and 42 via one outlet of control valves 49 and 49'. From chambers 41 and 42 the accumulator pressure propagates through the connection bores in body 29 to chambers 34 and 34' between the pistons 27 and 27' and floating pistons 31 and 31'. The accumulator pressure is applied to the cross-section surface of floating pistons 31 and 31' in chambers 34 and 34' and shifts floating pistons 31 and 31' against the force of the springs 32 and 32'. The pressure developed in chambers 38 and 38' lying in front of floating pistons 31 and 31' reaches, through the associated connection bores, circular chambers 44 and 45 and then through the pressure medium connection to the wheel brake cylinders of the statically braked wheels. The dynamically braked wheels, for example, are controlled in the known manner by inlet-and outlet valves which can be actuated electromagnetically and are not shown in the drawing, or they are controlled by a 3/2 directional control valve, by a control signal related to the state of motion of the wheels.

In case the preferably electronic controller of the antiskid device notices, that one of the statically braked wheels tends to lock, an output signal of the controller 65, actuates the appropriate one of the 3/2 directional control valves 49 and 49' and brings it into the switching position. Thus, the associated one of circular chambers 34 and 34' is separated from the accumulator and is connected with reservoir 18.

The brake pressure existing in the wheel brake cylinders of the controlled wheel and in the associated one of chambers 38 and 38' can press the associated one of floating pistons 31 and 31' back toward pistons 27 or 27' since circular chamber 34 or 34' is now without pressure and the brake pressure in the controlled wheel is released. When the state of motion of the wheel has recovered, the 3/2 directional control valve 49 returns to its original position and the brake pressure is increased again. This process is repeated until there is no longer a danger of locking, or the vehicle has come to a standstill.

Upon failure of the accumulator pressure, circular chamber 40 is without pressure and the force against surface 48 ceases, which holds cylindrical body 29 in its normal position together with the components it contains. Emergency spring 53 shifts cylindrical body 29 in housing 1 for the distance d until it strikes housing step 26. In this manner the actuated ends of rams 24 and 24' approach actuation element 5 for the same distance. Ram 55 projecting from cylindrical body 29 also strikes at step 26 of housing 1, thereby opening seal valve 56 and, thus, establishes a connection between the parts of the pressure medium connections which are connected with the statically applied wheel brake cylinders. In this way an unequal braking of the wheels, due to manufacturing tolerances, is avoided at the merely mechanical transmission of the brake pressure during a braking without accumulator pressure.

When the driver actuates the brake pedal, actuation element 5 is shifted against the strong simulator spring 8, whereby valve slide 6 is shifted by the force of simulator spring 8. The length of chamber 15 lying in front of valve slide 6 is advantageously equal to the distance d so that valve slide 6 can be shifted for this distance in shell 14. Thus, due to this arrangement, during an emergency actuation simulator spring 8 does not have to be compressed additionally. After a short distance actuation element 5 through pressure disc 12 strikes against the adjacent surfaces of rams 24 and 24'. Via rams 24 and 24' and pistons 27 and 27', floating pistons 31 and 31' are shifted and the brake pressure develops in the wheel brake cylinders of the statically braked wheels, whereby — as mentioned above — a pressure balance is effected by seat valve 56.

It should be noted that through the form of circular chambers 34 and 34' between pistons 27 and 27' and floating pistons 31 and 31' a different transformation ratio is effected when the accumulator is intact or fails. This different transformation ratio enable the same foot force at the brake pedal for braking in both cases and, thus, the driver is not irritated.

Figure 5:
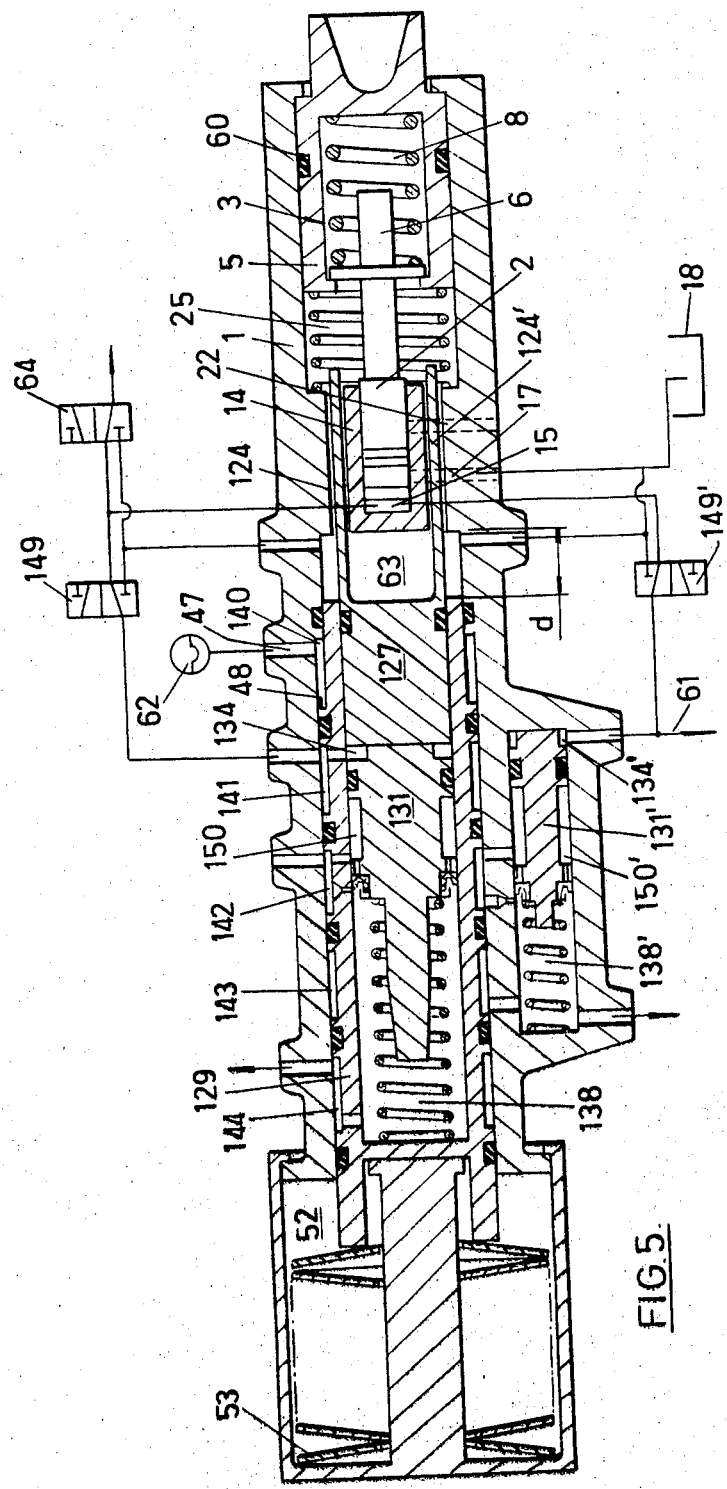
FIG. 5 is a longitudinal cross-sectional view through a second embodiment of the device according to the principles of the present invention.

FIG. 5 illustrates a longitudinal cross-sectional view of a second embodiment in accordance with the principles of the present invention. Parts that are identical to the part of FIG. 1 are described employing the same reference numbers. The difference, compared with the above described first embodiment of FIG. 1 is that in housing 1 are arranged two parallel cylinder bores having different diameters. The larger cylinder bore lies on the axis of the brake actuation arrangement and includes the above described pedal travel simulator 3 and accumulator braking valve 2. In the following part of this larger cylinder bore, which is widened by a step, the cylindrical body 129 is arranged such that it can be moved for a distance d. Body 129 includes in its cylinder bore, sealed against the inner wall thereof, the piston 127 and the floating piston 131, lying against the front surface of piston 127. The rams for the emergency actuation during a failure of the accumulator pressure here are formed as extensions 124, 124' of piston 127 and are guided in the above described manner by shell 14 of the accumulator braking valve 2. In the resting position of the device a circular chamber 134 is formed, between an extension of piston 127 and floating piston 131. In a smaller, parallel cylinder bore a floating piston 131' is sealed against the wall and is arranged such that it can move. In the resting position of an extension of the device floating piston 131' strikes the bottom of the smaller cylinder bore so that a circular chamber 134' is formed. Chamber 134' connected via a 3/2 directional control valve 149' with chamber 15 of accumulator braking valve 2. In addition chamber 134' is connected via a pressure medium line 61 with the wheel brake cylinders of a dynamically braked wheel. The chamber 138' lying in front of floating piston 131' is directly connected with the wheel brake cylinders of a statically braked wheel.

Recesses in the outer surface of cylindrical body 129 form several circular chambers 140, 141, 142, 143 and 144 which are all sealed against each other. The first circular chamber 140 is lmiited in one direction by a housing step and is connected with the accumulator 62. The pressure of the accumulator applied to ring surface 48 normally holds cylindrical body 129 away from its stop formed by the housing step by the distance d against the force of emergency spring 53. Circular chamber 141 is connected one one side with circular chamber 134 between piston 127 and floating piston 131 and is connected on the other side via a 3/2 directional control valve 149 with chamber 15 of accumulator braking valve 2. In addition, chamber 15 is connected via another 3/2 directional control valve 64 with the wheel brake cylinders of a second dynamically braked wheel. The third connection of 3/2 directional control valves 64, 149 and 149' are connected with the chamber 63, which in turn has a connection to reservoir 18. Circular chamber 142 is directly connected on one side via a pressure medium connection in housing 1 with reservoir 18 and is connected on the other side with circular chambers 150 and 150' which are formed by recesses in the outer surfaces of floating pistons 131 and 131'. In addition, circular chamber 142 is connected via chambers 150 and 150' and the associated breather bores with chambers 138 and 138' lying in front of floating pistons 131 and 131'. Circular chamber 143 is connected with chamber 138' lying in front of floating piston 131' and, in addition, can be connected, upon a failure of the accumulator pressure, by the actuation of a seat valve, not shown here, with chamber 138 lying in front of floating piston 131. Circular chamber 144 is connected with chamber 138 and is directly connected with the wheel brake cylinders of a second statically braked wheel.

As has already been mentioned every control subdivision can be achieved with a device according to this invention. In FIG. 5 the right front wheel is connected with chamber 138 and the left rear wheel with the chamber 138'. These two wheels are statically braked. The left front wheel and the right rear wheel are connected via 3/2 directional control valves 64 and 149' with chamber 15 of the accumulator braking valve 2. These wheels are dynamically braked. Both rear wheels are jointly controlled by the actuation of 3/2 directional control valve 149' while the front wheels can be separately controlled via the two 3/2 directional control valves 64 and 149. The brake actuation and the antiskid control are effected in the manner already described with respect to FIG. 1.

Figure 7:
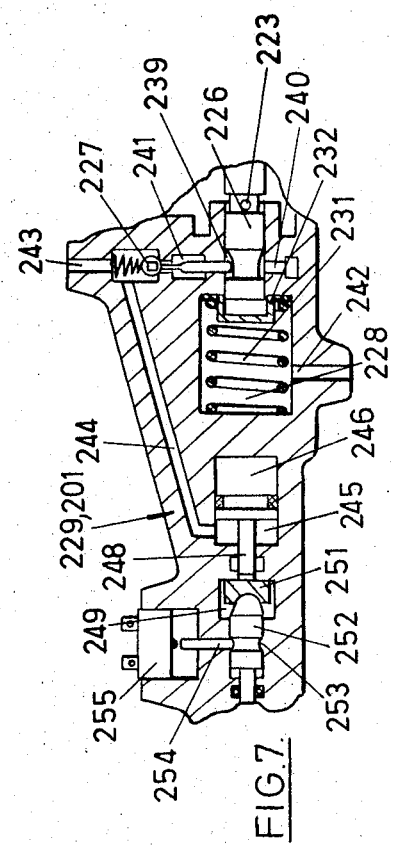
FIG. 7 illustrates a partial longitudinal cross-sectional view taken at right angle with respect to the view in FIG. 6 in the region of the accumulator braking valve and the electric pressure warning indicator.

FIGS. 6 and 7 illustrate a third embodiment according to the principles of this invention.

The actuating cylinders 202 and 202' for the statically braked wheels are disposed in housing 201 in parallel with each other and symmetrically with respect to the longitudinal axis of housing 201. Sealed against the inner surface of actuating cylinders 202 and 202' are disposed the floating pistons 203 and 203' which are slidable with respect to cylinders 202 and 202'. In the resting position of the device floating pistons 203 and 203' are held in contact with the central projections 205 and 205' of other pistons 206 and 206' by means of springs 204 and 204' which are supported by the bottom of actuating cylinders 202 and 202'. Pistons 206 and 206' are also slidably sealed in actuating cylinders 202 and 202'. Pistons 206 and 206' are sealed against the inner surfaces of cylinders 202 and 202'. Pistons 206 and 206' also have central projections 207 and 207' at the other end thereof. The projections 207 and 207' rest against the ring surface of a pot-shaped structural part 208 which is guided via a central opening in its bottom on the outer surface of a hollow cylinder 209 which is arranged centrally with respect ot the longitudinal axis. The wall of the pot-shaped structural part 208 has its outer surface sealed to the inner surface of housing 201 by the inwardly pointing collars 210 and 210° of housing 201 and has its inner surface sealed to the outer surface of cylinder 209 by an outwardly pointing collar 211 of cylinder 209. This sealing arrangement forms the two concentric circular chambers 212 and 213 which are connected by a cross bore 214 in the wall of the pot-shaped structural part 208 and which, as will be explained later, form a pressure medium reservoir. An emergency spring 215 is arranged concentrically around hollow cylinder 209 and is supported on one end by the bottom of the pot-shaped structural part 208 and on the other end by the outwardly pointing collar 216 of hollow cylinder 209. In hollow cylinder 209 is arranged the pedal travel simulator 217. Simulator 217 includes a hollow piston 218 which can be shifted in a slidably sealed manner in hollow cylinder 209 and which is secured against slidding out of cylinder 209 by means of a spring ring 219. Contact surface 220 of piston 218 includes a rounded recess into which the actuating element 221 extends. Element 221 is in engagement with the brake actuation pedal. In the central recess of hollow piston 218 there is disposed the strong simulator spring 222 which holds a thrust piece 223 in the actuation direction in contact with an inwardly pointing collar of hollow piston 218. An outwardly pointing collar 224 on actuating element 221 has the distance d from the ring surface of hollow cylinder 209. A protecting cap 225 which grips a groove of housing 201 and a groove of actuating element 221 protects the interior of the device from dirt and moisture.

The ring surface of hollow cylinder 209 adjacent collar 211 partly makes contact with the adjacent front surface of central part 229 of housing 201. A helical spring 230 is supported on one end by the front surface of central part 229 and is supported on the other end by a step in the outer surface of hollow piston 218 of pedal travel simulator 217. Spring 230 holds hollow piston 218 in the resting position of the device the distance d from central part 229.

The valve slide 226 of the accumulator braking valve lies against the front surface of thrust piece 223 of the pedal travel simulator 217 (see also FIG. 7). This valve slide 226 protrudes into the central bore of central part 229. This bore widens by means of a step into a chamber 228. A helical spring 231 is supported at one end by the bottom of chamber 228 and is supported at the other end by a pot-shaped base plate 232, which due to its shape allows for the shifting of the valve slide 226. In valve slide 226 there is provided a longitudinal bore 233 and a cross bore 234, which opens into a circular groove. This arrangement of bores in the resting position of the device connect chamber 228 with chamber 235 disposed between central part 229 and pedal travel simulator 217. Chamber 235 is continuously connected by means of a circular recess 236 and one of the cross bores 237 or 237' with the chamber 238 and 238' lying in front of the pistons 206 and 206' of the actuating cylinders 202 and 202'. Chambers 238 and 238' are connected via the connection 266 with the reservoir. A circular groove 239 in the shaped surface of valve slide 226 is connected with a circular channel 240 in the central part 229. The shaped surface has an actuation ramp for the tappet 241 of the accumulator connection valve 227 which protrudes through an opening of the circular channel 240 (see FIG. 7). The accumulator connection valve 227 is formed in the known manner as a ball seat valve. The chamber 228 in front of the accumulator braking valve 226 is connected via a cross bore 242 in central part 229 of housing 201 with the housing connection for the pressure medium lines of the dynamically applied brake circuit.

In case the accumulator pressure fails there is a warning- and security device designed in the central part 229 of housing 201 (see also FIG. 7). The supply line 243 for the accumulator pressure is connected via a channel 244 in central part 229 with a small cylinder 245 in which a piston 246 is held against the force of a spring 247 in contact with the bottom of the cylinder when the accumulator pressure is building up. Out of cylinder 245 a projection 248 of piston 246 protrudes through a longitudinal bore into a recess 249 of central part 229 which connects the circular chambers 250 and 250' which are formed in the outer surfaces of floating pistons 203 and 203'. In recess 249 there is loosely arranged a rocker arm 251 against which lies extension 248 of piston 246. This rocker arm 251 protrudes with its two ends for a certain length into the circular chambers 250 and 250' of floating pistons 203 and 203'. On the other surface of the rocker arm 251 there is arranged a central trough in which the head end of a slide 252, which is guided in a bore of central part 229, grips rocker arm 251. In the outer surface of slide 252 there is arranged a circular groove 253 into which the contact pin 254 of the electric warning indicator device 255 extends via a vertical bore. An extension of the slide 252 is slidably sealed in the bore of central part 229 and is opposite to a valve closing element 256 of a seat valve, which is arranged in the same bore, and which is kept closed by means of a spring 257. On both sides of the valve seat there are located bores 258 and 259 in central part 229 which ends in one of the chambers 260 and 260' present in actuating cylinders 202 and 202' in front of floating pistons 203 and 203'. Longitudinal bores in slide 252 and valve closing element 256 provide for the necessary pressure balance.

For example for the so-called Y-control (separately controlled front wheels, jointly controlled rear wheels) the pressure medium connections are to be arranged as follows.

Each of chambers 260 and 260' lying in actuating cylinders 202 and 202' in front of the front surface of the floating pistons 203 and 203' are connected via the connections 261 and 261' with the wheel braking cylinders of one of the statically braked front wheels. Via a breather bore there is a connection from each of these chambers 260 and 260' to the balance tanks 262 and 262' which are also connected via housing bores with circular chambers 250 and 250' at floating pistons 203, 203'. The circular chambers 263 and 263' which are formed between floating pistons 203 and 203' and pistons 206 and 206' through extensions 205 and 205' are connected via the connections 264 and 264' with the one connection of a 3/2 directional control valves 265 and 265', respectively. In the first switching position of these 3/2 directional control valves 265 and 265' they connect the circular chambers 263 and 263' as indicated in FIG. 6 with chamber 228 lying in front of the accumulator braking valve. As has already been mentioned chamber 228 is also connected with the wheel braking cylinders of the dynamically braked rear wheels. In the second switching position of valves 265 and 265', achieved by the antiskid control signal, the 3/2 directional control valves 265 and 265' connect circular chambers 263 and 263' with reservoir 18. A 3/2 directional control valve, which is not shown in the drawing, can separate the wheel braking cylinders from chamber 228 and can connect the wheel braking cylinders with reservoir 18 is also included in the pressure medium connection from chamber 228 to the dynamically actuated rear wheel brakes. Besides being connected with the accumulator connection valve or the accumulator braking valve, the pressure medium accumulator is also connected via the connection 267 with the concentric circular chambers 212 and 213 which are connected with each other. THe accumulator pressure acting upon the ring surface at the bottom of the pot-shaped structural part 208 as well as upon the ring surface at the collar 211 of the hollow cylinder 209 keeps the emergency spring 215 under tension and holds hollow cylinder 209 the distance d away from actuating element 221 in its original position.

The operation of this embodiment is as follows. When the device is intact, the accumulator pressure is applied to accumulator connections valve 227 and chamber 245 of the warning device. The accumulator pressure in chamber 245 holds piston 246 against the force of spring 247 in contact with the bottom of chamber 245. THe accumulator pressure is also present in circular chamber 213 which keeps emergency spring 215 under tension.

When the driver actuates the brake pedal for a normal braking, at first pedal travel simulator 217 enters into operation. Actuating element 221 is shifted together with hollow piston 218 against the force of the strong simulator spring 222, whose prestress is zero, or in other words, is equal to the force of the counter springs plus the occurring frictional forces. Simulator spring 222 is compressed corresponding to the control pressure and, thus, the foot force is transmitted via the strong simulator spring 222 upon thrust piece 223 and valve slide 226 of the accumulator braking valve so that valve slide 226 is shifted in correspondence to increasing foot force and continuous compression of simulator spring 222. Through the control groove at cross bore 234 in valve slide 226 at first the connection between the chamber 228 lying in front of the accumulator braking valve and chamber 235 which is connected with the reservoir is interrupted and at the same time tappet 241 of accumulator connection valve 227 is lifted by the actuation ramp of circular groove 239 at valve slide 226 and said valve 227 is opened, so that when the control groove of valve slide 226 reaches circular groove 240 the accumulator pressure, controlled in correspondence to the foot force can enter chamber 228 in front of the accumulator braking valve. From there the accumulator pressure transfers through connection 242 (see FIG. 7) on the one side via the above mentioned but not shown 3/2 directional control valve to the wheel braking cylinders of the rear wheels and on the other side via the 3/2 directional control valves 265 and 265', in their first switching position, into circular chambers 263 and 263' between floating pistons 203 and 203' and pistons 206 and 206'. On the one hand, the accumulator pressure in chambers 263 and 263' keeps pistons 206 and 206' in their original position, since chamber 238 and 238' are pressure-less and, on the other hand, the accumulator pressure in chambers 263 and 263' acts upon floating pistons 203 and 203' to shift these floating pistons to actuate the wheel brakes of the front wheels via connections 261 and 261'.

When in the regulator of the antiskid device, which is preferably electronic, it is noticed that one of the statically braked wheels tends to lock, an output signal of the regulator, not shown here, actuates the appropriate one of the 3/2 directional control valve 265 and 265' to switch it to its second switching positions. In this second switching position the switched control valve connects the associated one of circular chamber 263 and 263' with the reservoir. The brake pressure, existing in the wheel braking cylinders of the respective wheel and in the associated one of chambers 260 and 260' in front of the front surface of floating pistons 203 and 203', can push back the associated one of floating pistons 203 and 203' in accordance with the pressure reduction in the associated one of circular chambers 263 and 263' and the brake pressure is released in the controlled wheel. When the state of motion of the wheel has recovered again the associated one of the 3/2 directional control valves 265 and 265' returns to its original position and the brake pressure increases again. This process is repeated until there is no danger of locking, or the vehicle has come to a standstill.

When the accumulator pressure fails, circular chambers 212 and 213 connected with each other become pressureless and the force which kept emergency spring 215 in tension and the hollow cylinder 209 in its original position ceases. Emergency spring 215 moves hollow cylinder 209 with its collar 216 in contact with collar 224 of actuating element 221, i.e., it shifts it for the distance d as compared with pedal travel simulator 217 and pot-shaped structural part 208. The ring surface of the wall of structural part 208 keeps in contact with extension 207 and 207' of pistons 206 and 206'.

Thus, a purely mechanical transmission of the braking force for emergency braking of the front wheels connected to connections 261 and 261' is possible via actuating element 221, strong emergency spring 215, hollow cylinder 209, pot-shaped structural part 208, pistons 206 and 206' and floating pistons 203 and 203'. With the failure of the accumulator pressure, chamber 245 of the warning- and security device has also become pressureless at the same time. Spring 247 shifts piston 246 so that its extension via rocker arm 251 actuates slide 252. Slide 252 shifts contact pin 254 resting in its circular groove 253 so that a contact is made at electric warning device 255 and a perceptible signal is produced, which indicates the failure to the driver. When slide 252 is shifted it lies against valve closing element 256 and lifts it against the force of spring 257 from its seat and thereby a connection is made via bores 258 and 259 between the statically applied brake chambers 260 and 260' of the front wheels so that a pressure balance can take place and an unequal braking of the two wheels due to manufacturing inaccuracies under purely mechanical transmission of the brake pressure is avoided.

It has to be noted that a different transformation ratio results at intact and failed accumulator pressure. During a pressure failure actuating element 221 and floating pistons 203 and 203' travel the same distance due to the mechanical connection while when the accumulator pressure is intact floating pistons 203 and 203' travel a longer distance than actuating element 221 due to the design of simulator spring 222. By properly designing simulator spring 222 there can be obtained a force-travel characteristic at the brake pedal that is practically the same under failed and intact accumulator pressure conditions.

The above-mentioned seat valve 256 between the connecting bores 258 and 259 of brake chambers 260 and 260' lying in front of floating pistons 203 and 203' fulfills yet another important function. When, due to bad ventillation in one of the brake lines, connected to brake chambers 260 and 260' the associated one of floating pistons 203 and 203' in a normal braking comes against a front stop provided by rocker arm 251 which projects into circular chambers 250 and 250' and seat valve 256 is opened and the warning switch is actuated. Thus, there is avoided a differential pressure developed in the brake lines when one of floating pistons 203 and 203' rests against the stop provided by rocker arm 251.

While we have described above the principles of our invention in connection with specific apparatus it is to be clearly understood that this description is made only by way of example and not as a limitation to the scope of our invention as set forth in the objects thereof and in the accompanying claims.

We claim:

1. A combined brake pressure modulator and brake actuator arrangement for an antiskid control system comprising:
 a source of pressurized brake pressure medium;
 a brake pressure medium reservoir;
 a housing having a longitudinal axis;

a first chamber within said housing coupled to said source to receive said pressurized medium upon actuation of a brake actuator, said first chamber supplying said pressurized medium to at least a first of a plurality of brake circuits;

at least a first floating piston disposed in said housing spaced from said first chamber and parallel to said axis, said first floating piston having an actuating surface in transverse relation to said axis adjacent said first chamber, said first floating piston when actuated supplying braking pressure to at least a second of said plurality of brake circuits connected to said housing adjacent the surface of said first floating piston opposite and parallel to said actuating surface; and at least a first control valve external to said housing having a first operating position to connect said first chamber to said actuating surface to thereby actuate said first floating piston by said pressurized medium upon actuation of said brake actuator and a second operating position to connect said actuating surface to said reservoir, said first control valve responding to an antiskid control signal to switch between said first and second operating positions to control the motion of said first floating piston to enable modulation of said braking pressure in said second of said plurality of brake circuits to prevent wheel lock.

2. An arrangement according to claim 1, further including first means disposed at least partially within said housing associated with said first floating piston to mechanically actuate said first floating piston upon failure of said source to provide emergency braking.

3. An arrangement according to claim 2, wherein said first means includes at least a first piston within said housing parallel to said axis in alignment with said first floating piston, one transverse surface of said first piston contacting said actuating surface when said first floating piston is in its rest position and when said first floating piston is mechanically actuated, and at least one ram extending from the other transverse surface of said first piston away from said first floating piston.

4. An arrangement according to claim 3, further including second means to enable said first chamber to receive said pressurized medium and to mechanically actuate said ram when said source fails, said second means including a braking valve coupled to said source,
an actuation element coupled to said brake actuator,
a brake actuator pressure transmitting element coupled to said brake valve, and
a strongly prestressed simulator spring disposed between said actuation element and said pressure transmitting element,
said actuation element being capable of engaging said ram upon failure of said source to mechanically actuate said rams and, hence, mechanically actuate said first floating piston through said first piston.

5. An arrangement according to claim 4, wherein said braking valve includes a valve slide, and
said pressure transmitting element is formed as an integral part of said valve slide.

6. An arrangement according to claim 5, wherein said simulator spring is compressed proportional to a control pressure exerted on said brake actuator and said control pressure is transmitted by said simulator spring to said valve slide.

7. An arrangement according to claim 6, wherein an end of said ram remote from said first piston is spaced a minimum distance $d$ from the adjacent end of said actuation element in a pressureless chamber under normal operation of said arrangement.

8. An arrangement according to claim 7, wherein said second means further includes a shell disposed coaxial of said axis and between said braking valve and said housing; and
said ram is guided in a longitudinal recess in the outer surface of said shell.

9. An arrangement according to claim 8, further including a cylindrical body disposed coaxial of said axis slidably sealed against the inner surface of said housing, said cylindrical body having at least first bore disposed parallel to said axis, said first floating piston and said first piston being disposed in and slidably sealed to the inner surface of said first bore; and wherein
said first means further includes
a prestressed emergency spring engaging an end of said cylindrical body adjacent a housing connection to said second of said plurality of brake circuits;
said cylindrical body being held said distance "d" away from a housing stop disposed on the inner surface of said housing adjacent the other end of said cylindrical body by said pressurized medium against the force of said emergency spring when said source is operative.

10. An arrangement according to claim 9, wherein said cylindrical body includes said first bore, and
a second bore parallel to said axis,
said first and second bores being symmetrically spaced from said axis; and further including
a second floating piston disposed in said second bore, and
a second piston disposed in said second bore,
said second floating piston and said second piston being disposed in said second bore in the same manner as said first floating piston and said first piston are disposed in said first bore to control braking pressure in a third of said plurality of brake circuits having a housing connection adjacent said emergency spring,
said second floating piston and said second piston cooperating with said first and second means in the same manner as said first floating piston and said first piston for controlling braking pressure in said third of said plurality of brake circuits by said pressurized medium when said source is operative and mechanically when said source fails.

11. An arrangement according to claim 10, further including second, third, fourth, fifth, sixth and seventh circular chambers disposed in tandem and sealed from each other between the inner surface of said housing and the outer surface of said cylindrical body;

said second chamber being limited by said housing stop and connected to said source;

said third chamber being connected to an eighth circular chamber disposed between said second floating piston and said second piston and to a first outlet of a second control valve whose input is connected to said first chamber and whose second outlet is connected to said reservoir, said second control valve responding to an antiskid control signal to control said second floating piston as said first control valve controlled said first floating piston to modulate said braking pressure of said third of said plurality of brake circuits;

said fourth chamber being connected to a ninth circular chamber disposed between said first floating piston and said first piston and to a first outlet of said first control valve;

said fifth chamber being connected to a tenth circular chamber disposed between the outer surface of said first floating piston and the inner surface of said first bore, to an eleventh circular chamber disposed between the outer surface of said second floating piston and the inner surface of said second bore and to said reservoir, said tenth chamber being connected by a first breather bore to a twelfth chamber disposed between said first floating piston and an adjacent end wall of said first bore, said eleventh chamber being connected by a second breather bore to a thirteenth chamber disposed between said second floating piston and an adjacent end wall of said second bore;

said sixth chamber being connected to said twelfth chamber and to said second of said plurality of brake circuits; and said seventh chamber being connected to said thirteenth chamber and to said third of said plurality of brake circuits.

12. An arrangement according to claim 11, further including
a first locking element to seal the end of said first bore adjacent said twelfth chamber; and
a second locking element to seal the end of said second bore adjacent said thirteenth chamber;
each of said first and second locking element including
a first seat valve actuated by an extension of the associated one of said first and second floating pistons present in an associated one of said twelfth and thirteenth chambers to control a connecting channel between said twelfth and thirteenth chambers.

13. An arrangement according to claim 12, further including
a stop plate of insulating material disposed at the end of said cylindrical body adjacent to and in operative association with said first and second locking elements; and
a pair of electrical contacts of a warning device disposed in said stop plate in operative association with an associated one of said first seat valves, said warning device being actuated when an associated one of said first seat valves is actuated and it contacts an associated one of said electrical contacts.

14. An arrangement according to claim 13, wherein said cylindrical body further includes
a third bore disposed parallel to said axis and adjacent the outer surface of said cylindrical body,
a second seat valve disposed in said third bore, and
a second ram disposed in said third bore extending toward said brake actuator, said second ram being actuated by striking said housing stop upon failure of said source to actuate said second seat valve,
said second seat valve controlling two radial bores in said cylindrical body, each of said two radial bores being connected to an associated one of said second and third of said plurality of brake circuits.

15. An arrangement according to claim 14, wherein said second piston includes
a third ram extending toward said brake actuator, and
braking pressure is mechanically applied to said second and third of said plurality of brake circuits upon failure of said source by means of said actuation element, said first and third ram, said first and second pistons and said first and second floating pistons.

16. An arrangement according to claim 15, wherein said first chamber is disposed between the bottom of said shell and said valve slide, said first chamber having a length equal to said distance $d$.

17. An arrangement according to claim 9, wherein said cylindrical body includes
said first bore coaxial of said axis.

18. An arrangement according to claim 17, further including
second, third, fourth, fifth and sixth circular chambers disposed in tandem and sealed from each other between the inner surface of said housing and the outer surface of said cylindrical body;
said second chamber being limited by said housing stop and connected to said source;
said third chamber being connected to a seventh circular chamber disposed between said first floating piston and said first piston and to a first outlet of said first control valve;
said fourth chamber being connected to an eighth circular chamber disposed between the inner surface of said first bore and the outer surface of said first floating piston, to a ninth chamber by a first breather bore and to said reservoir, said ninth chamber being disposed between said first floating piston and an adjacent end wall of said first bore; and
said sixth chamber being connected to said ninth chamber and to said second of said plurality of brake circuits.

19. An arrangement according to claim 18, wherein said housing further includes
a second bore disposed parallel to said first bore spaced from said axis, said second bore being closed at both ends;
a second floating piston disposed in said second bore having an actuating surface adjacent one end of said second bore,
a tenth chamber disposed in said second bore between said one end of said second bore and said actuating surface of said second floating piston, and an eleventh chamber disposed in said second bore between the other end of said second bore and a surface of said second floating piston opposite said actuating surface of said second floating piston, said eleventh chamber being connected to said fifth chamber and to a third of said plurality of brake circuits, and said tenth chamber being connected to a fourth of said plurality of brake circuits; and further including a second control valve similar in operation to said first control valve, an input of said second control valve being connected to said first chamber, a first outlet of said second control valve being connected to said tenth chamber and said fourth of said plurality of brake circuits and a second outlet of said second control valve being connected to said reservoir.

20. An arrangement according to claim 19, wherein said fourth chamber is connected to a twelfth chamber disposed between the inner surface of said second bore and the outer surface of said second floating piston and to said eleventh chamber by a second breather bore.

21. An arrangement according to claim 20, wherein said seventh chamber is connected to said ninth chamber by a third breather bore, and said twelfth chamber is connected to said eleventh chamber by a fourth breather bore.

22. An arrangement according to claim 2, wherein said housing includes a first bore spaced from and parallel to said axis to receive said first floating piston, a second bore spaced from and parallel to said axis, said first and second bores being symmetrical with said axis, and a second floating piston having an actuating surface in transverse relation to said axis adjacent said first chamber, said second floating piston when actuated supplying braking pressure to at least a third of said plurality of brake circuits connected to said housing adjacent the surface of said second floating piston opposite and parallel to said actuating surface of said second floating piston;

said first means includes a first piston within said first bore in alignment with said first floating piston, said first piston having a first extension engaging said actuating surface of said first floating piston when said first floating piston is in its rest position and when said first floating piston is mechanically actuated, a second piston within said second bore in alignment with said second floating piston, said second piston having a second extension engaging said actuating surface of said second floating piston when said second floating piston is in its rest position and when said second floating piston is mechanically actuated, a first structural element engaging a third extension of said first piston extending toward said brake actuator and engaging a fourth extension of said second piston extending toward said brake actuator, a second structural element disposed within said first structural element, said first and second structural elements cooperating to form a second chamber between an inner surface of said first structural element and an outer surface of said second structural element, said second chamber being connected to said source, and a prestressed emergency spring supported by said first and second structural elements, said first and second structural elements being held in their rest position by said pressurized medium in said second chamber and said emergency spring with one end of said second structural element engaging a housing stop and the other end of said second structural element being spaced a distance $d$ from an actuation element connected to said brake actuator.

23. An arrangement according to claim 22, wherein said first chamber is disposed coaxial of said axis between said first and second bores; and said second structural element is a hollow cylinder disposed coaxial of said axis between said first chamber and said acutation element.

24. An arrangement according to claim 23, further including a braking valve coupled to said source and said first chamber disposed coaxial of said axis between said first chamber and said hollow cylinder, said braking valve having a valve slide; and a brake actuator pressure simulator icluding a hollow piston having a closed end engaging said actuation element and an open end adjacent said braking valve, said open end having an inwardly directed flange, said hollow piston being disposed coaxial of said axis and slidably sealed to the inner surface of said hollow cylinder, a thrust piece disposed coaxial of said axis engaging said valve slide and extending in a sliding relation with said inwardly directed flange into said hollow piston, and a pressure simulator spring disposed within said hollow piston coaxial of said axis, one end of said simulator spring engaging said closed end of said hollow piston and the other end of said simulator spring engaging said thrust piece.

25. An arrangement according to claim 24, wherein said first structural element is pot-shaped having an opening in the bottom thereof through which said hollow cylinder is slidably sealed and a ring surface adjacent the open end thereof engaging said third and fourth extensions.

26. An arrangement according to claim 25, wherein said second chamber is defined by the inner surface and bottom of said pot-shaped structural element, the outer surface of said hollow cylinder and the inner surface of a first collar formed in the outer surface of said hollow cylinder adjacent said braking valve, said first collar being slidably sealed to the inner surface of said pot-shaped structural element.

27. An arrangement according to claim 26, wherein a second collar is formed in the outer surface of said hollow cylinder adjacent said actuation element, and said emergency spring is supported by the outer surface of the bottom of said pot-shaped structural element and said second collar.

28. An arrangement according to claim 27, wherein the effect of said pressurized medium in said second chamber and the effect of said emergency spring oppose one another.

29. An arrangement according to claim 28, wherein the outer surface of said pot-shaped structural element is slidably sealed to the inner surface of said housing.

30. An arrangement according to claim 29, further including
a third circular chamber disposed between the outer surface of said third extension and the inner surface of said first bore; and
a fourth circular chamber disposed between the outer surface of said fourth extension and the inner surface of said second bore;
said third and fourth chambers being connected to said reservoir.

31. An arrangement according to claim 30, wherein said actuation element includes a stop; and
said second collar is spaced from said stop said distance *d*.

32. An arrangement according to claim 31, further including
a fifth chamber disposed in said first bore between said first floating piston and a closed end of said first bore, said second of said plurality of brake circuits being connected to said fifth chamber;
a sixth chamber disposed in said second bore between said second floating piston and a closed end of said second bore, said third of said plurality of brake circuits being connected to said sixth chamber; and
a warning and security device disposed coaxial of said axis.

33. An arrangement according to claim 32, further including
a seventh chamber disposed between the outer surface of said first extension and the inner surface of said first bore;
said first control valve connecting said first chamber to said seventh chamber in one of its operating positions;
an eighth chamber disposed between the outer surface of said second extension and the inner surface of said second bore; and
a second control valve similar to said first control valve connecting said first chamber to said eighth chamber in one of its operating positions.

34. An arrangement according to claim 33, wherein said warning and security device includes
a ninth chamber coaxial of said axis having a bottom adjacent said first chamber,
a third piston disposed in said ninth chamber,
a reaction spring disposed between said bottom of said ninth chamber and said third piston,
said ninth chamber being coupled to said source and said third piston is forced against said reaction spring by said pressurized medium,
a fifth extension connected to said third piston extending away from said bottom of said ninth chamber in a slidably sealed relation with a bore coaxial of said axis,
a rocker arm being disposed in a transverse relation with said axis, one surface of said rocker arm engaging said fifth extension,
a slide disposed coaxial of said axis having one end in engagement with the other surface of said rocker arm,
a contact pin of a warning device in engagement with a predeterminedly shaped portion of the outer surface of said slide to actuate said warning device upon failure of said source, and
a seat valve in contact with the other end of said slide, said seat valve being opened upon failure of said source to interconnect said fifth and sixth chambers by means of radially disposed bores.

35. An arrangement according to claim 34, wherein said slide is moved toward said seat valve by said reaction spring upon failure of said source to actuate said warning device and open said seat valve.

36. An arrangement according to claim 35, wherein one end of said rocker arm extends into said fifth chamber and the other end of said rocker arm extends into said sixth chamber, and
said rocker arm can be actuated by either of said first and second floating pistons before said first and second floating pistons reach the closed end of the associated one of said first and second bores.

* * * * *